(12) United States Patent
Kim

(10) Patent No.: US 12,183,983 B2
(45) Date of Patent: Dec. 31, 2024

(54) METHOD, APPARATUS AND COMPUTER PROGRAM FOR OPTIMIZING DRIVING OF ANTENNA

(71) Applicant: KOREA AEROSPACE RESEARCH INSTITUTE, Daejeon (KR)

(72) Inventor: Dae Kwan Kim, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 255 days.

(21) Appl. No.: 17/738,338

(22) Filed: May 6, 2022

(65) Prior Publication Data

US 2022/0263239 A1 Aug. 18, 2022

Related U.S. Application Data

(63) Continuation of application No. PCT/KR2020/019302, filed on Dec. 29, 2020.

(30) Foreign Application Priority Data

Dec. 31, 2019 (KR) .................. 10-2019-0179805

(51) Int. Cl.
  *H01Q 3/08* (2006.01)
  *H01Q 3/00* (2006.01)
  *H04B 7/185* (2006.01)

(52) U.S. Cl.
  CPC ............... *H01Q 3/08* (2013.01); *H01Q 3/005* (2013.01); *H04B 7/18519* (2013.01)

(58) Field of Classification Search
  CPC ....... H01Q 3/08; H01Q 3/005; H04B 7/18519
  (Continued)

(56) References Cited

U.S. PATENT DOCUMENTS

| | | | | |
|---|---|---|---|---|
| 5,697,582 A | * | 12/1997 | Surauer | B64G 1/407 244/168 |
| 8,090,312 B2 | * | 1/2012 | Robinson | H04B 7/18519 455/12.1 |

(Continued)

FOREIGN PATENT DOCUMENTS

| | | |
|---|---|---|
| CA | 2157108 A1 | 7/1995 |
| JP | 07280919 A | 10/1995 |

(Continued)

OTHER PUBLICATIONS

International Search Report and Written Opinion including English Translation of International Search Report issued in corresponding International Application PCT/KR2020/019302, mailed Apr. 9, 2021, 11 pages.

(Continued)

*Primary Examiner* — April G Gonzales
(74) *Attorney, Agent, or Firm* — Guntin & Gust, PLC; Miyoung Shin

(57) ABSTRACT

A method of optimizing driving of an antenna for communication of an artificial satellite, by controlling a rotation angle of the antenna, according to an embodiment of the disclosure, includes: receiving a basic profile indicating a change in a rotation angle of the antenna such that a center line of the antenna points to a ground station in response to movement of the artificial satellite; determining a processing section with reference to points at which a rotation velocity of the antenna, for the basic profile, is zero; and generating an optimization profile that determines the change in the rotation angle of the antenna by configuring the rotation velocity of the antenna, for the processing section, with a preset optimized rotation velocity.

17 Claims, 12 Drawing Sheets

(58) Field of Classification Search
USPC .......................................................... 455/12.1
See application file for complete search history.

(56) References Cited

U.S. PATENT DOCUMENTS

| | | | | |
|---|---|---|---|---|
| 10,541,470 | B2* | 1/2020 | Jeon | H01Q 3/08 |
| 2001/0028327 | A1* | 10/2001 | Yamamoto | H01Q 3/08 |
| | | | | 343/757 |
| 2003/0088359 | A1* | 5/2003 | Park | G01C 21/3629 |
| | | | | 700/200 |
| 2006/0145379 | A1* | 7/2006 | Okazaki | B29C 45/77 |
| | | | | 425/149 |
| 2009/0210366 | A1* | 8/2009 | Sakata | G06N 3/126 |
| | | | | 706/13 |
| 2010/0032854 | A1* | 2/2010 | Okazaki | B29C 45/77 |
| | | | | 425/149 |
| 2011/0240095 | A1* | 10/2011 | Murillo-Mora | H01L 31/0547 |
| | | | | 136/246 |
| 2012/0154229 | A1* | 6/2012 | Kagaya | H01Q 13/10 |
| | | | | 343/713 |
| 2013/0321157 | A1* | 12/2013 | Takamura | G06Q 50/01 |
| | | | | 340/573.1 |
| 2013/0325959 | A1* | 12/2013 | Takamura | H04L 67/10 |
| | | | | 709/204 |
| 2013/0332410 | A1* | 12/2013 | Asano | G06V 40/20 |
| | | | | 707/609 |
| 2019/0202582 | A1* | 7/2019 | Kitamura | B64G 3/00 |
| 2021/0066778 | A1* | 3/2021 | Cha | H01Q 3/02 |
| 2024/0055757 | A1* | 2/2024 | Sakamoto | H01Q 1/34 |

FOREIGN PATENT DOCUMENTS

| | | |
|---|---|---|
| JP | 07283642 A | 10/1995 |
| KR | 100205277 B1 | 7/1999 |
| KR | 1020050025410 A | 3/2005 |
| KR | 100983067 B1 | 9/2010 |
| KR | 101782259 B1 | 9/2017 |

OTHER PUBLICATIONS

Office Action issued in corresponding KR Application 10-2019-0179805, issued Nov. 6, 2020 and an English translation thereof, 10 pages.

Grant of Patent issued to corresponding KR Application 10-2019-0179805, issued Apr. 13, 2021, and an English translation thereof, 8 pages.

* cited by examiner

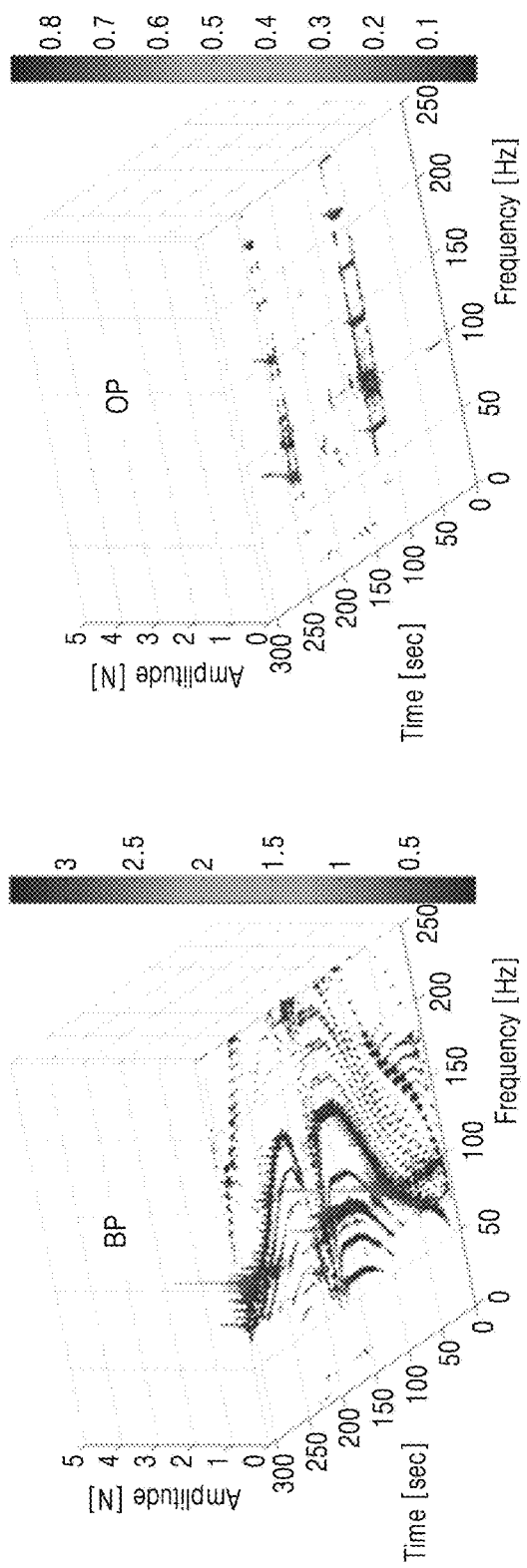

ated to the present disclosure and may not constitute prior art.
METHOD, APPARATUS AND COMPUTER PROGRAM FOR OPTIMIZING DRIVING OF ANTENNA

CROSS REFERENCE TO RELATED APPLICATIONS

This application is a continuation application of International Application No. PCT/KR2020/019302, filed Dec. 29, 2020, which claims priority to and the benefit of KR 10-2019-0179805, filed Dec. 31, 2019. The disclosures of the above applications are incorporated herein by reference in their entirety.

FIELD

The disclosure relates to a method, an apparatus, and a computer program, for optimizing driving of an antenna, and more particularly, to a method, an apparatus, and a computer program, for optimizing driving of an antenna by which image jitter may be reduced and thus image quality may be improved.

BACKGROUND

The statements in this section merely provide background information related to the present disclosure and may not constitute prior art.

An image-mounting object for capturing images, a communication antenna for transception with a ground station, and the like may be mounted on an artificial satellite. Vibration or structural resonance occurring in the image-mounting object and the like due to movements of the artificial satellite or the communication antenna may result in shaking of a line of sight. In this case, short-term phase variation of an image signal and the like may cause image jitter, and this may result in a degradation of image quality.

SUMMARY

This section provides a general summary of the disclosure and is not a comprehensive disclosure of its full scope or all of its features.

The disclosure provides a method, an apparatus, and a computer program for optimizing driving of an antenna, by which movements of the antenna may be reduced as much as possible by optimizing changes in a rotation angle and a rotation velocity of the antenna to reduce image jitter and improve image quality.

A method of optimizing driving of an antenna for communication of an artificial satellite by controlling a rotation angle of the antenna, according to an embodiment of the disclosure, includes: receiving a basic profile indicating a change in a rotation angle of the antenna such that a center line of the antenna points to a ground station in response to a movement of the artificial satellite; determining a processing section with reference to points at which a rotation velocity of the antenna for the basic profile is zero; and generating an optimization profile that determines the change in the rotation angle of the antenna by configuring the rotation velocity of the antenna for the processing section with preset optimization rotation velocities.

The receiving of the basic profile may include: receiving information regarding to the optimized rotation velocity of the antenna, the information determined according to a structure of the artificial satellite; receiving information regarding a rotation angle determined according to a structure of the antenna, the information regarding the rotation angle in which communication between the antenna and the ground station is allowed; and generating an uppermost profile and a lowermost profile, based on the rotation angle, in which the communication between the antenna and the ground station is allowed, and the basic profile.

The method may further include, after the determining of the processing sections, determining a start boundary angle and a finish boundary angle of the processing section, based on the basic profile, the uppermost profile, and the lowermost profile.

The generating of the optimization profile may include: determining a rotation area in which the antenna rotates at the optimized rotation velocity and a stop area in which the antenna does not rotate, such that an error between the basic profile and the optimization profile for the processing section has a minimum value; and determining the optimization profile of the processing section based on the rotation area for the processing section.

Information regarding the optimized rotation velocity may include a first optimized rotation velocity and a second optimized rotation velocity greater than the first optimization velocity, and the generating of the optimization profile may further include: selecting the first optimized rotation velocity as a rotation velocity of the antenna; determining a rotation area in which the antenna rotates at the first optimized rotation velocity and a stop area in which the antenna does not rotate, such that an error between the basic profile and the optimization profile for the processing section has a minimum value; and determining the optimization profile of the processing section based on the rotation area for the processing section.

The generating of the optimization profile may further include generating an optimization profile for a next processing section when a rotation angle according to the optimization profile in the processing section is between a rotation angle according to the uppermost profile and a rotation angle according to the lowermost profile.

The generating of the optimization profile, when a rotation angle according to the optimization profile in the processing section is not between a rotation angle according to the uppermost profile and a rotation angle according to the lowermost profile and an absolute value of the first optimized rotation velocity is less than an absolute value of a rotation velocity according to the basic profile, may further include: selecting the second optimized rotation velocity as the rotation velocity of the antenna; determining a rotation area in which the antenna rotates at the second optimized rotation velocity and a stop area in which the antenna does not rotate, such that an error between the basic profile and the optimization profile for the processing section has a minimum value; and determining the optimization profile of the processing section based on the rotation area for the processing section.

The generating of the optimization profile, when a rotation angle according to the optimization profile in the processing section is not between a rotation angle according to the uppermost profile and a rotation according to the lowermost profile and an absolute value of the first optimized rotation velocity is greater than an absolute value of the rotation velocity according to the basic profile, may further include: determining a first rotation area in which the antenna rotates at the first optimized rotation velocity, a second rotation in which the antenna rotates at the first optimized rotation velocity, and the stop area between the first rotation area and the second area, such that an error of the basic profile and the optimization profile with respect to the processing section has a minimum value; and determining the optimization profile of the processing section, based on the first rotation area, the stop area, and the second area with respect to the processing section.

The antenna may use a wireless signal in a X-band having a frequency range from 8 GHz to 12 GHz.

An apparatus for optimizing driving of an antenna for communication of an artificial satellite by controlling a rotation angle of the antenna, the apparatus including the antenna and a controller, wherein the controller is configured to receive a basic profile indicating a change in a rotation angle of the antenna such that a center line of the antenna points to a ground station in response to a movement of the artificial satellite, determine a processing section based on points at which a rotation velocity of the antenna for the basic profile is zero, and generate an optimization profile that determines changes in the rotation angle of the antenna, by configuring the rotation velocity of the antenna for the processing section with preset optimization rotation velocities.

The controller may be configured to receive information regarding the optimized rotation velocity of the antenna determined according to a structure of the artificial satellite, receive information regarding a rotation angle determined according to the structure of the antenna, the rotation angle in which communication between the antenna and the ground station is allowed, and generate an uppermost profile and a lowermost profile, based on the rotation angle, in which the communication between the antenna and the ground station is allowed, and the basic profile.

The controller may be configured to, after determining the processing section, determine a start boundary angle and a finish boundary angle of the processing section, based on the basic profile, the uppermost profile, and the lowermost profile.

The controller may be configured to determine a rotation area in which the antenna rotates at the optimized rotation velocity and a stop area in which the antenna does not rotate, such that an error between the basic profile and the optimization profile with respect to the processing section has a minimum value, and may also be configured to determine the optimization profile of the processing section, based on the rotation area for the processing section.

Information regarding the optimized rotation velocity includes a first optimized rotation velocity and a second optimized rotation velocity greater than the first optimized rotation velocity, and the controller may be configured to select the first optimized rotation velocity as a rotation velocity of the antenna, determine a rotation area in which the antenna rotates in the first optimized rotation velocity and a stop area in which the antenna does not rotate, such that an error between the basic profile and the optimization profile for the processing section has a minimum value, and generate the optimization profile by determining the optimization profile of the processing section based on the rotation area for the processing section.

The controller may be configured to generate the optimization profile by generating an optimization profile for a next processing section when a rotation angle according to the optimization profile in the processing section is between a rotation angle according to the uppermost profile and a rotation angle according to the lowermost profile.

The controller may be configured to, when a rotation angle according to the optimization profile in the processing section is not between a rotation angle according to the uppermost profile and a rotation angle according to the lowermost profile and an absolute value of the first optimized rotation velocity is less than an absolute value of a rotation velocity according to the basic profile, determine a rotation area in which the antenna rotates at the second optimized rotation velocity and a stop area in which the antenna does not rotate, such that an error between the basic profile and the optimization profile for the processing section has a minimum value, and generate the optimization profile by determining the optimization profile of the processing section, based on the rotation area for the processing section.

The controller may be configured to, when a rotation angle according to the optimization profile in the processing section is not between a rotation angle according to the uppermost profile and a rotation angle according to the lowermost profile and an absolute value of the first optimized rotation velocity is greater than an absolute value of the rotation velocity according to the basic profile, determine a first rotation area in which the antenna rotates at the first optimized rotation velocity, a second rotation area in which the antenna rotates at the first optimized rotation velocity, and a stop area between the first rotation area and the second rotation area, such that an error between the basic profile and the optimization profile for the processing section has a minimum value, and may also be configured to determine the optimization profile of the processing section, based on the first rotation area, the stop area, and the second rotation area for the processing section, to thereby generate the optimization profile.

The antenna may use a wireless signal in a X-band having a frequency range from 8 GHz to 12 GHz.

The disclosure may provide a method, an apparatus, and a computer program for optimizing driving of an antenna, by which movements of the antenna may be reduced as much as possible by optimizing changes in a rotation angle and a rotation velocity of the antenna to reduce image jitter and improve image quality.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 4A:
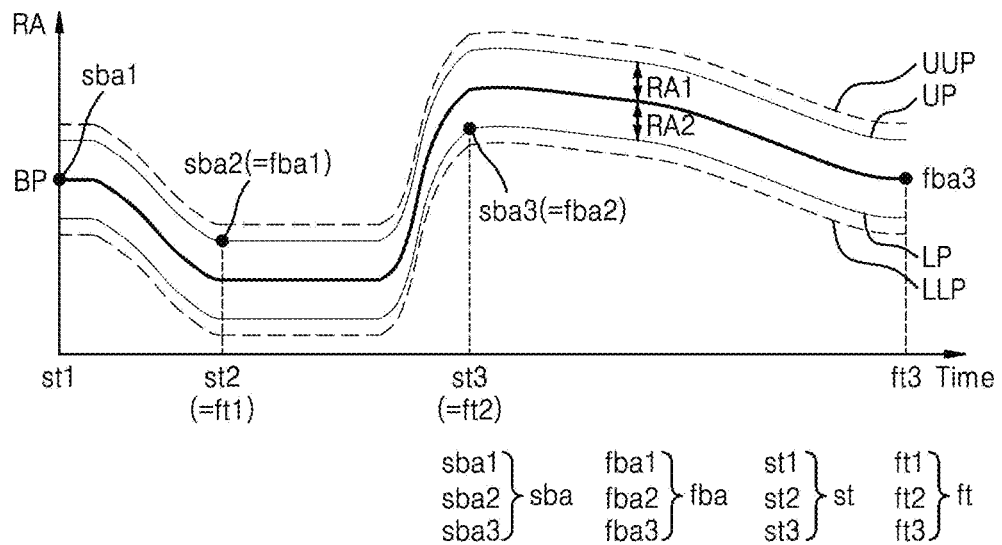
Figure 4B:
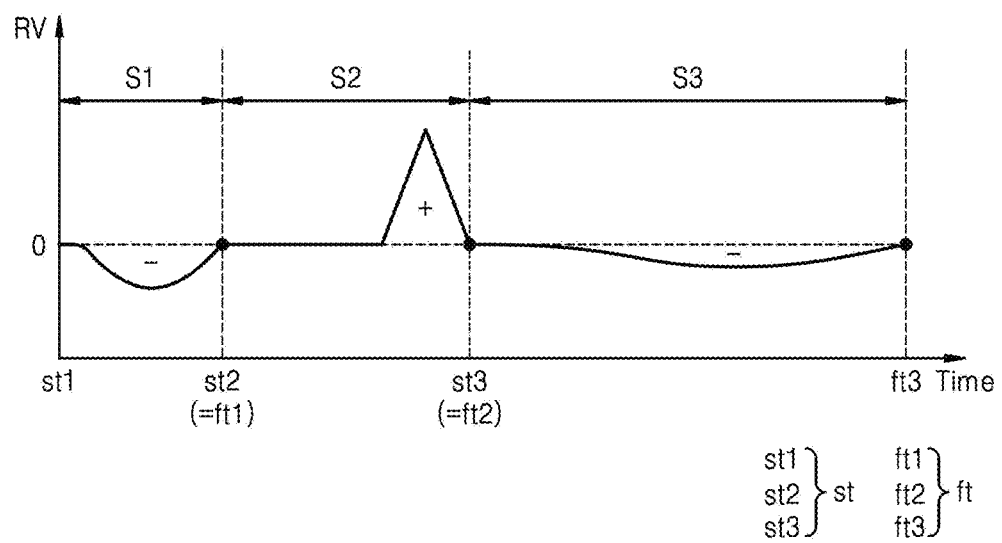
Figure 5:
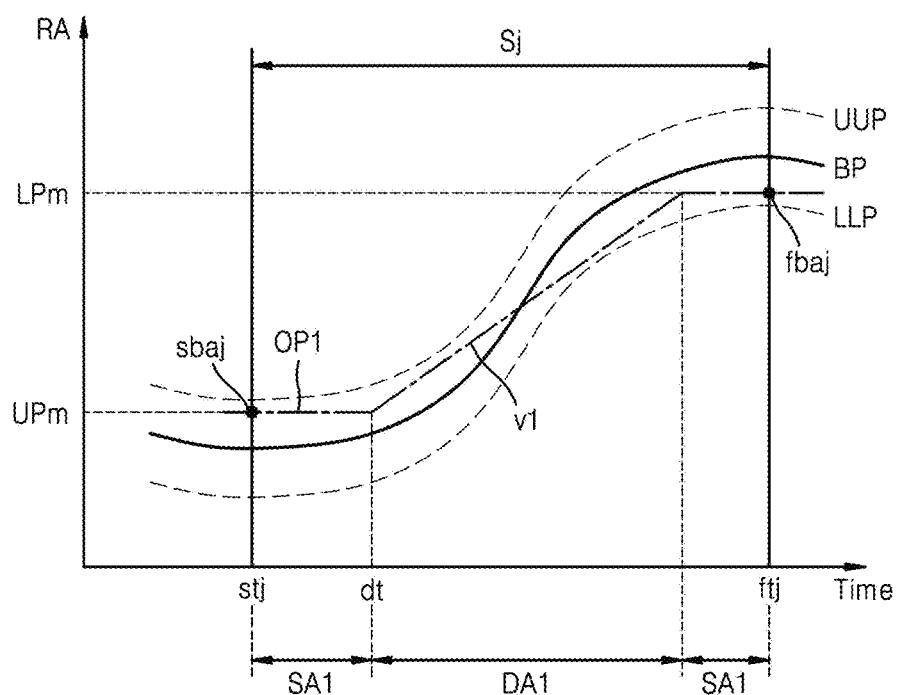
Figure 6:
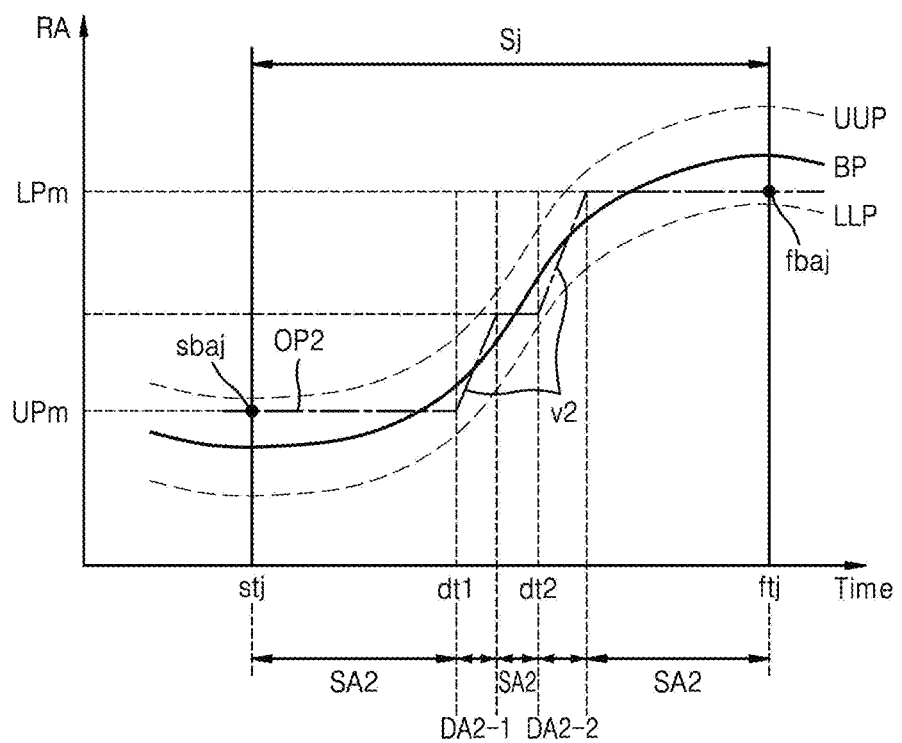
Figure 7A:
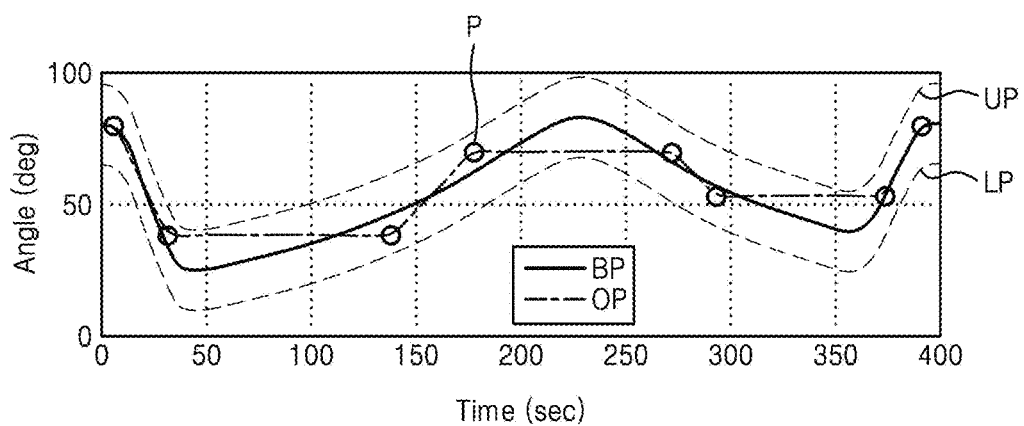
Figure 7B:
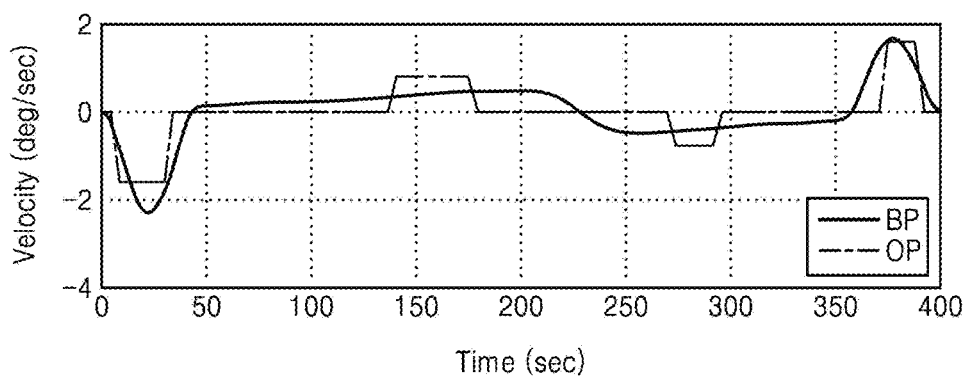
Figure 8:
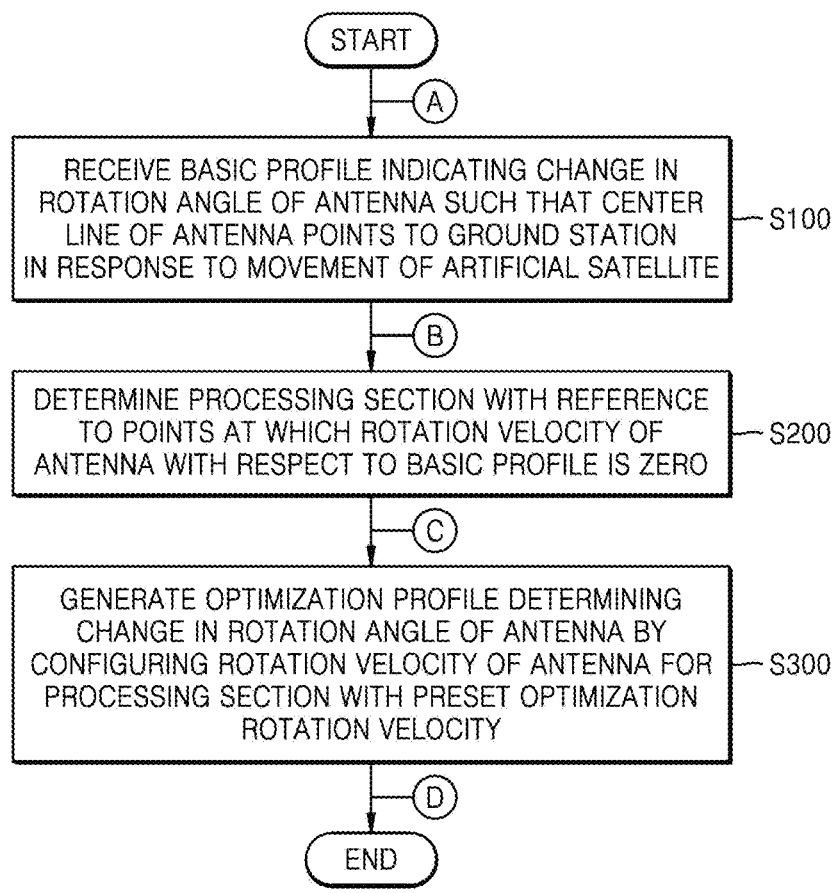
Figure 9:
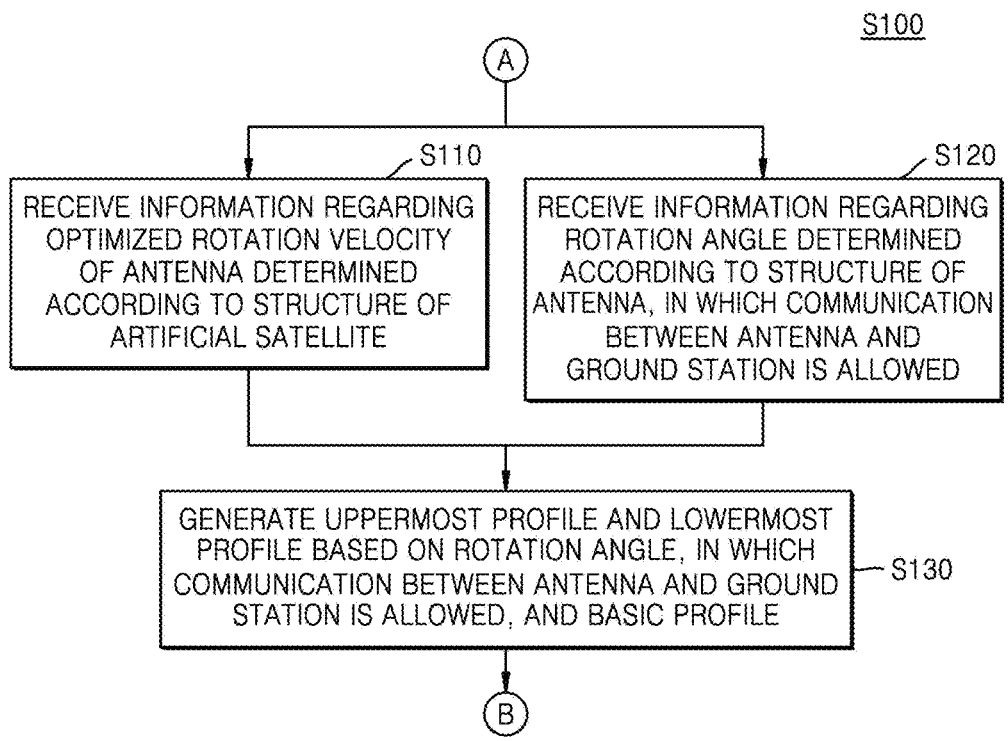
Figure 10:
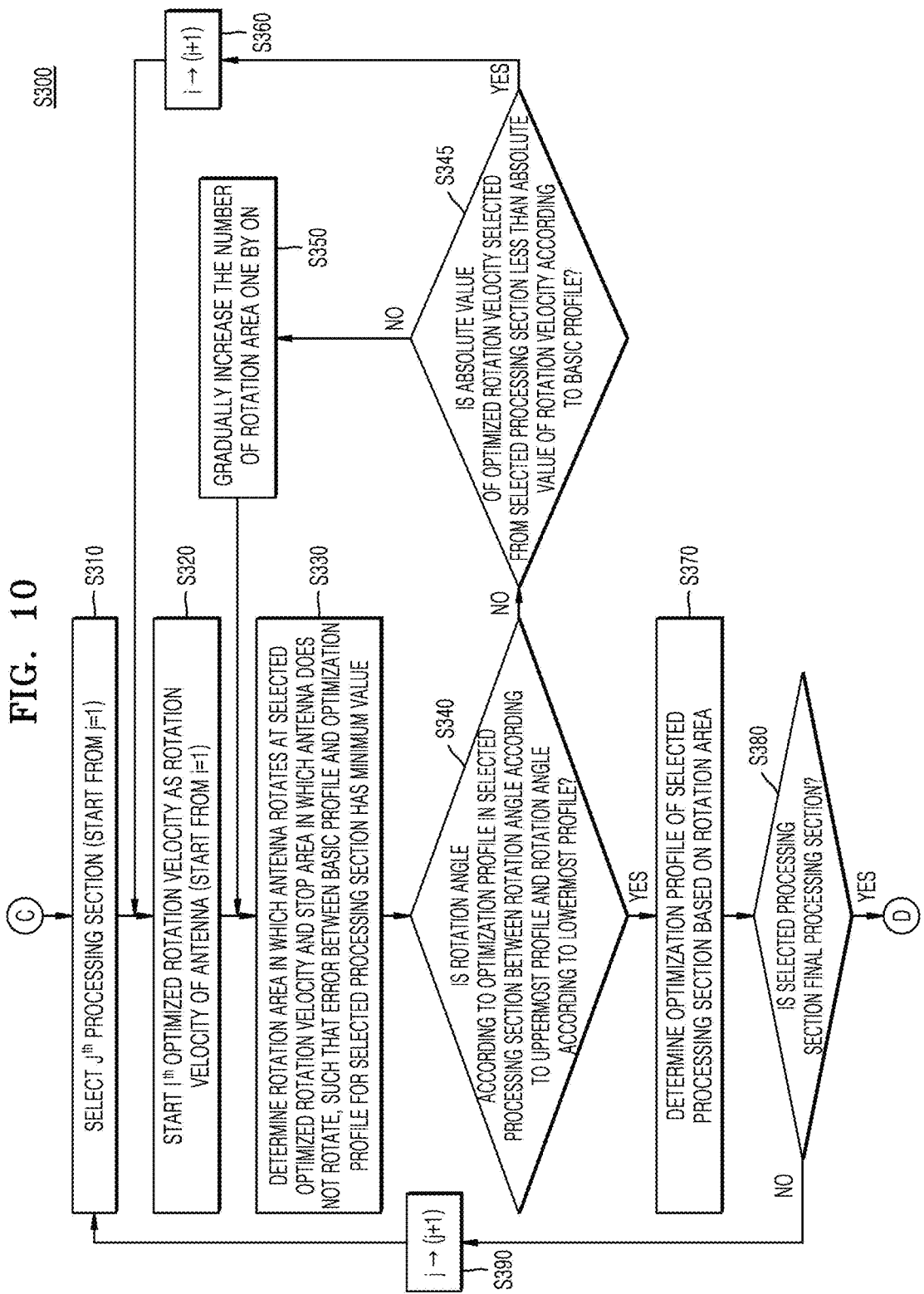
Figure 12A:
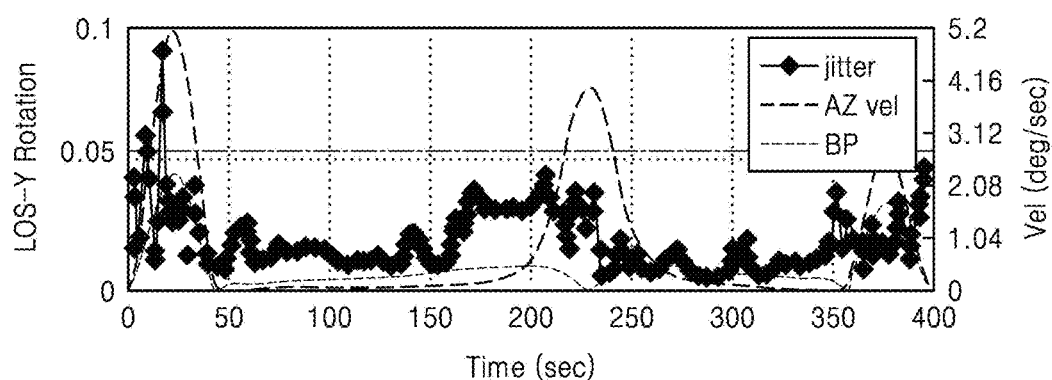
Figure 12B:
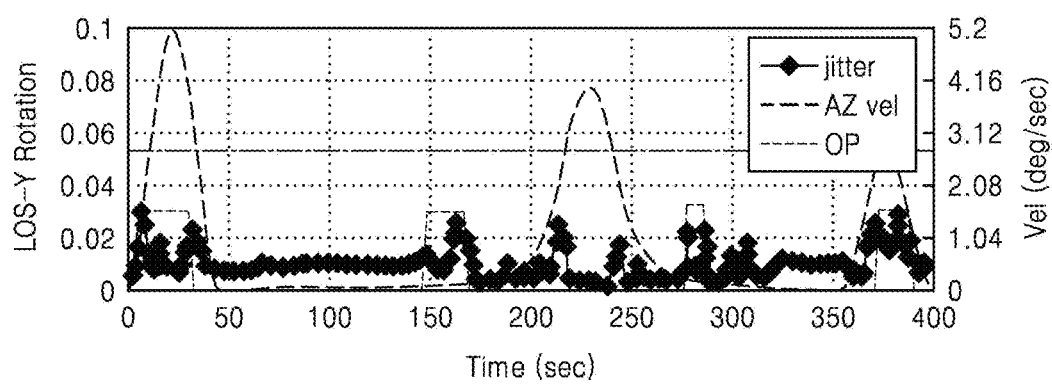

FIGS. 4A and 4B are diagrams of a driving profile and a rotation rate profile of a rotation angle of an antenna, according to an embodiment of the disclosure, wherein FIG. 4A shows a rotation angle profile indicating the changes in the rotation angle of the antenna according to time, and FIG. 4B shows a rotation velocity profile indicating the changes in the rotation velocity of the antenna according to time;

FIGS. 5 and 6 each are a diagram for describing a method of generating an optimization profile for a specific processing section, according to an embodiment of the disclosure, wherein in FIG. 5, the antenna rotates at a first optimized rotation velocity, and in FIG. 6, the antenna rotates at a second optimized rotation velocity;

FIG. 7A is a diagram of an optimization profile of a rotation angle for a rotation velocity, according to an embodiment of the disclosure;

FIG. 7B is a diagram of an optimization profile for a rotation velocity, according to an embodiment of the disclosure;

FIG. 8 is a flowchart of a method of optimizing driving of an antenna, according to an embodiment of the disclosure;

FIG. 9 is a flowchart for describing specific operations of the method of FIG. 8 in further detail;

FIG. 10 is a flowchart for describing specific operations of the method of FIG. 8 in further detail;

FIGS. 11A and 11B show a result of comparing amplitudes of a vibration source of an antenna before and after optimizing driving of the antenna, according to an embodiment of the disclosure, wherein FIG. 11A shows an amplitude of the vibration source of the antenna according to the basic profile, and FIG. 11B shows an amplitude of the vibration source of the antenna according to the optimization profile according to an embodiment; and FIGS. 12A and 12B show a result of comparing image jitter profiles before and after optimizing driving of an antenna according to an embodiment of the disclosure, wherein FIG. 12A shows image jitter of the basic profile before the optimization, and FIG. 12B shows image jitter of the optimization profile after the optimization.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As the disclosure allows various modifications and may have various embodiments, specific embodiments will be illustrated in the accompanying drawings and described in detail in the following description. Advantageous effects and features of the disclosure and methods of achieving the same will be clearly understood with reference to embodiments described in detail in conjunction with the accompanying drawings. However, the disclosure is not limited to the embodiments described herein and may be variously embodied.

Hereinafter, embodiments of the disclosure will be described in detail with reference to the accompanying drawings, and in the description, same reference numerals are used for same or corresponding components, and repeated descriptions thereof will be omitted.

In the following embodiments, terms such as "first," "second" are not intended to have limited sense and are only used to distinguish one component from others. Hereinafter, unless explicitly defined otherwise throughout the context, a singular form expression also includes a plural form expression. In the following description, the terms such as "include," "have" indicate presence of features or components described in the specification, and are not to preclude possibility of addition of one or more other features or components. For convenience of explanation, sizes of the components may be exaggerated or reduced. For example, sizes and types of components in the drawings are arbitrarily shown for convenience of explanation, and accordingly, the disclosure is not limited to the drawings.

Figure 1:
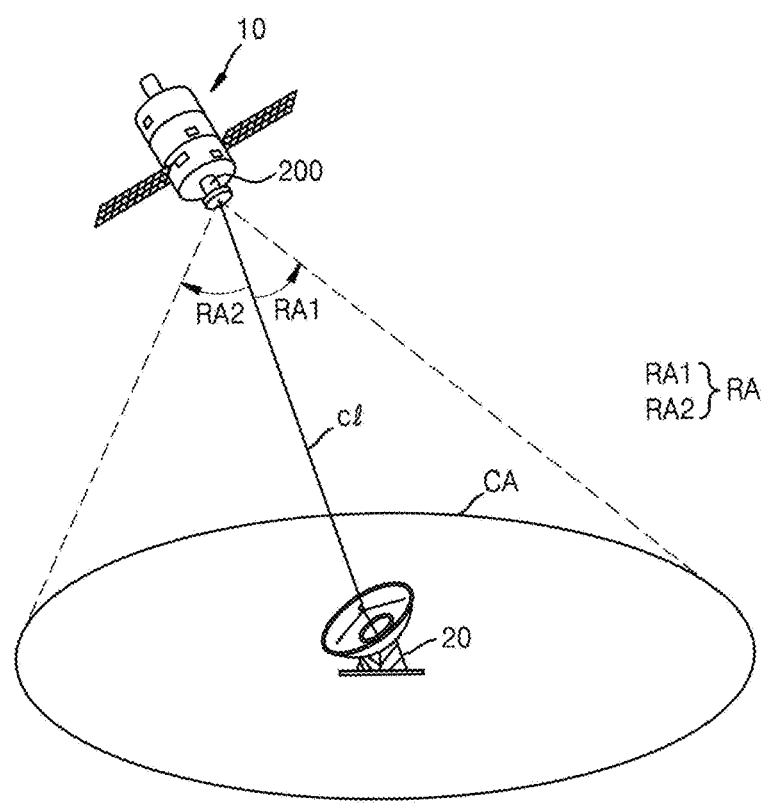
FIG. 1 is a diagram of a system for describing a method of optimizing driving of an antenna, according to an embodiment of the disclosure.

FIG. 1 is a diagram of a system for describing a method of optimizing driving of an antenna, according to an embodiment of the disclosure.

Referring to FIG. 1, an artificial satellite 10 of the disclosure may include a communication antenna 200 (which will be hereinafter described as an antenna 200). In the disclosure, the artificial satellite 10, which is a global navigation satellite, may include an apparatus for transmitting/receiving data to/from a ground station 20 and transmitting satellite signals to a receiver (not shown) while revolving around the Earth in a pre-known orbit.

A center line cl of the antenna 200 may point to the ground station 20 to correspond to movements of the artificial satellite 10. The antenna 200 may rotate by a preset rotation angle RA (RA1, RA2) around the center line cl. The antenna 200 may determine a communicable area CA in which the artificial satellite 10 revolving in the pre-known orbit may communicate with the ground station 20, while rotating according to the rotation angle RA in a first direction and/or a second direction set in advance. Although FIG. 1 shows only one ground station 20, in the system according to the embodiment of the disclosure, the number of ground station 20 is not limited thereto.

Figure 2:
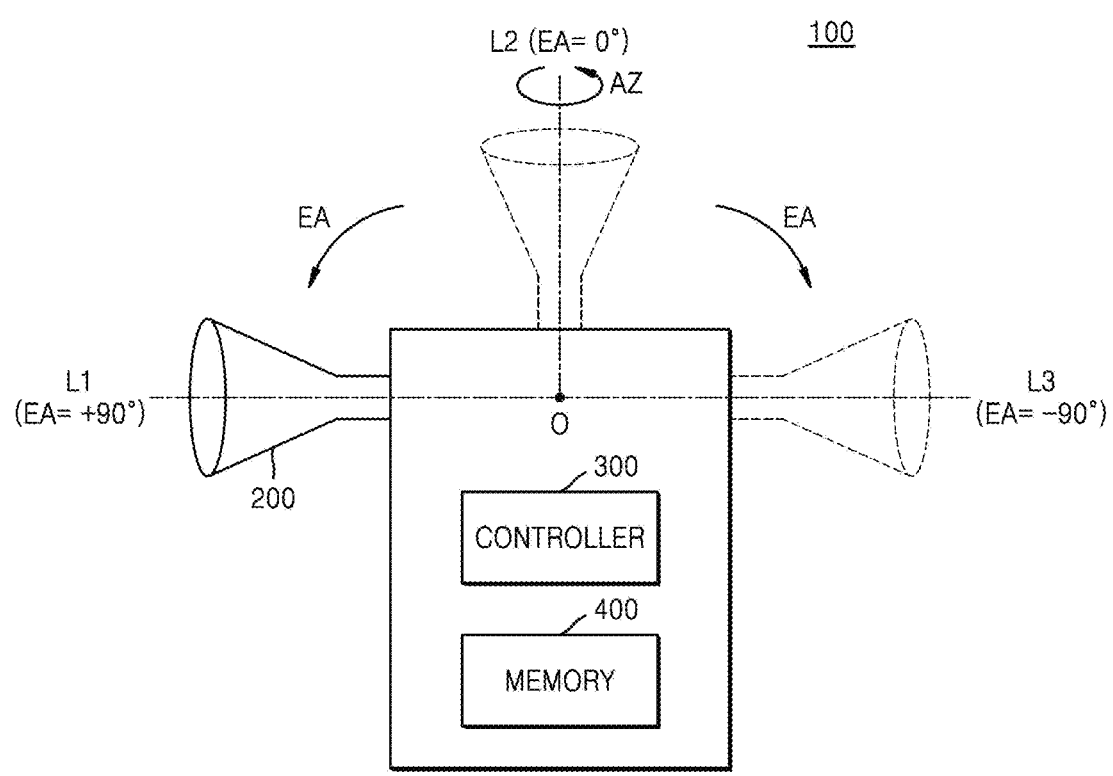
FIG. 2 is a schematic diagram of a configuration of an apparatus for optimizing driving of an antenna, according to an embodiment of the disclosure.

FIG. 2 is a schematic diagram of a configuration of an apparatus for optimizing the driving of the antenna, according to an embodiment of the disclosure. Same contents as the contents described above will be briefly described or omitted, and FIG. 2 will be described in conjunction with FIG. 1.

An apparatus 100 for optimizing the driving of the antenna of the disclosure may include the antenna 200, a controller 300, and a memory 400.

The antenna 200, which is a dual-axis pointing apparatus, may include an azimuth stage, in which azimuth rotation in a range from 0° to 360° may be performed, and an elevation stage, in which elevation rotation in a range from 0° to 180° may be performed. The rotation angle RA described above with reference to FIG. 1 may include an elevation angle EA and an azimuth AZ.

For convenience of explanation, FIG. 2 mainly shows cases in which the rotation axis of the antenna 200 is on L1, L2, and L3. For example, with reference to a case in which the rotation axis of the antenna 200 is on L2 (where the elevation angle EA is at 0°), the elevation angle EA when the rotation axis is on L1 may be +90°, and the elevation angle EA when the rotation axis is on L3 may be −90°. The azimuth AZ of the antenna 200 may have a value from 0° to 360° at every position at which elevation rotation may be performed.

The antenna 200 may use a wireless signal in an X-band having a frequency range from 8 GHz to 12 GHz, but the band including signals used by the antenna 200 is not limited thereto.

The controller 300 may include any type of apparatuses capable of processing data, for example, a processor. Here, the term "processor" may indicate a data processing device embedded in hardware, the data processing device having physically structuralized circuits to perform functions expressed as codes or instructions included in programs. An example of the data processing device embedded in hardware like this may include a microprocessor, a central processing unit (CPU), a processor core, a multiprocessor, an application-specific integrated circuit (ASIC), a field programmable gate array (FPGA), and the like, but the scope of the disclosure is not limited thereto.

The controller 300 according to an embodiment may receive a basic profile showing changes in the elevation angle EA of the antenna 200 according to time. The basic profile may be determined such that the center line cl of the antenna 200 points to the ground station 20 in response to a movement of the artificial satellite 10.

The controller 300 may determine a processing section with reference to a point at which a rotation velocity of the antenna 200 with reference to the basic profile is zero. A profile for the rotation velocity may be calculated by differentiating the basic profile with respect to time.

In addition, the controller 300 may configure the rotation velocity of the antenna 200 for the processing section as a preset optimized rotation velocity, to thereby generate an optimization profile determining the changes in the elevation angle EA. Operations of the controller 300 will be described in further detail with reference to FIGS. 3 to 7.

The memory 400 temporarily or permanently stores data processed by the apparatus 100 according to an embodiment. The memory 400, which is a computer-recordable recording medium, may include random access memory (RAM), read-only memory (ROM), and a permanent mass storage device such as a disk drive. In addition, the memory 400 may include magnetic storage media or flash storage media, but the scope of the disclosure is not limited thereto.

As described above, the apparatus 100 for optimizing the driving of the antenna, according to an embodiment, may optimize driving of the antenna 200 and reduce movements of the antenna 200 as much as possible, to thereby reduce image jitter and improve image quality.

Hereinafter, a method of optimizing the driving of the antenna according to an embodiment will be sequentially described with reference to FIGS. 3 to 7. Same contents as the contents described above will be briefly described or omitted, and FIGS. 3 to 7 will be described in conjunction with FIGS. 1 and 2.

Figure 3:
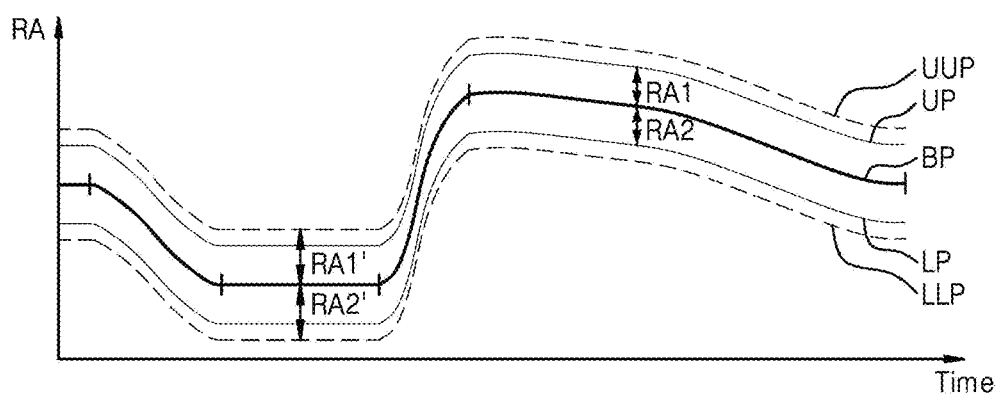
FIG. 3 is a diagram of a driving profile, according to an embodiment of the disclosure.

FIG. 3 is a diagram of a driving profile, according to an embodiment of the disclosure.

FIG. 3 shows an example of a basic profile BP, an uppermost profile UP, and a lowermost profile LP, according to an embodiment. The basic profile BP, the uppermost profile UP, and the lowermost profile UP indicate changes in the rotation angle RA of the antenna 200 according to time. Hereinafter, the rotation angle RA of the antenna 200 may indicate the elevation angle EA described above.

The controller 300 may receive the basic profile BP indicating the changes in the elevation angle EA of the antenna 200. The controller 300 may receive information about an optimized rotation velocity of the antenna 200 determined according to a structure of the artificial satellite 10. The optimized rotation velocity may be a preset velocity to prevent resonance of image-mounting objects and the like mounted in the artificial satellite 10.

The controller 300 may receive information about rotation angles RA1 and RA2 determined by the structure of the antenna 200, the rotation angles RA1 and RA2 in which the antenna 200 may communicate with the ground station 20. In addition, the controller 300 may generate the uppermost profile UP and the lowermost profile LP, based on the rotation angles RA1 and RA2, in which the antenna 200 may communicate with the ground station 20, and the basic profile BP. The uppermost profile UP may be determined to have a value greater by the rotation angle RA1 in which the antenna 200 may communicate with the ground station 20, with reference to the basic profile BP. The lowermost profile LP may be determined to have a value less by the rotation angle RA2 in which the antenna 200 may communicate with the ground station 20, with reference to the basic profile BP.

Here, to set the communicable area CA (see FIG. 1) to have a margin, the rotation angles RA1 and RA2, in which the antenna 200 may communicate with the ground station 20, may be set as a value obtained by subtracting a margin from reference rotation angles RA1' and RA2'. A profile having a value greater than the basic profile BP by the reference rotation angle RA1' may be referred to as a reference uppermost profile UUP. A profile having a value greater than the basic profile BP by the reference rotation angle RA2' may be referred to as a reference lowermost profile LLP.

Hereinafter, a graph like FIG. 3, in which the basic profile BP, the uppermost profile UP, the lowermost profile LP, the reference uppermost profile UUP, and the reference lowermost profile LLP are collectively shown, may be named and described as 'a driving profile'. Any one of the uppermost profile UP/lowermost profile LP or the reference uppermost profile UUP/reference lowermost profile LLP may be omitted from the driving profile.

A method of determining a processing section for optimizing the driving of the antenna 200 according to an embodiment will be described with reference to FIGS. 4A and 4B. FIGS. 4A and 4B are diagrams of a driving profile and a rotation velocity profile of the rotation angle of the antenna according to an embodiment of the disclosure.

For example, each processing section may be expressed by a quintic polynomial, and the quintic polynomial may be determined as start time st (st1, st2, st3) and each processing section and six polynomial coefficients. For example, the basic profile BP may be divided into up to twenty processing sections.

Hereinafter, an example in which the driving profile has three processing sections, that is, a first processing section S1, a second processing section S2, and a third processing section S3 will be described with reference to FIGS. 4A and 4B. FIG. 4A shows a rotation angle profile indicating the changes in the rotation angle RA of the antenna 200 according to time, and FIG. 4B shows a rotation velocity profile indicating the changes in the rotation velocity RV of the antenna 200 according to time. The rotation velocity profile may be calculated by differentiating the basic profile BP of the rotation angle RA with respect to time.

The controller 300 may determine a first processing section S1, a second processing section S2, and a third processing section S3 with reference to points at which a rotation velocity RV of the antenna 200 with respect to the basic profile BP is zero. The points at which the rotation velocity RV of the antenna 200 is zero may include points at which start times of the first processing section S1, the second processing section S2, and the third processing section S3 are st1, st2, and st3, respectively. After the first processing section S1, the second processing section S2, and the third processing section S3 have been determined, start boundary angles sba (sba1, sba2, and sba3) and finish boundary angles fba (fba1, fba2, and fba3) of the first processing section S1, the second processing section S2, and the third processing section S3 may be determined. The start boundary angles sba may indicate the rotation angles RA at the start time st1 of the first processing section S1, the start time st2 of the second processing section S2, and the start time st3 of the third processing section S3, and the finish boundary angles fba may indicate the rotation angles RA at the finish times ft, that is, the rotation angles RA at a finish time ft1 of the first processing section S1, a finish time ft2 of the second processing section S2, and a finish time ft3 of the third processing section S3. Hereinafter, a method of determining the start boundary angles sba and the finish boundary angles fba will be described in further detail.

The start boundary angles sba and the finish boundary angles fba may be determined based on values of the basic profile BP, the uppermost profile UP, and the lowermost profile LP. Among the plurality of processing sections, the start boundary angle sba1 (see FIGS. 4A and 4B) of an initial processing section, i.e., the first processing section S1 (see FIGS. 4A and 4B) and the finish boundary angle fba3 (see FIG. 4) of a final processing section, i.e., the third processing section S3 (see FIGS. 4A and 4B) may be determined based on the value of the basic profile BP. The other start boundary angles sba2 and sba3 and finish boundary angles fba1 and fba2 may be determined based on the value of the uppermost profile UP or the lowermost profile LP.

For example, referring to FIG. 4A, the start boundary angle sba1 of the first processing section S1 and the finish boundary angle fba3 of the third processing section S3 may be on the basic profile BP. The start boundary angle sba2 of a second processing section S2 and the start boundary angle sba3 of a third processing unit sba3 may be on the uppermost profile UP or the lowermost profile LP. Here, the start boundary angle sba2 of the second processing section S2 may be equal to the finish boundary angle fba1 of the first processing section S1, and the start boundary angle sba3 of the third processing section S3 may be equal to the finish boundary angle fba2 of the second processing section S2.

More particularly, when a rotation velocity RV of a previous processing section has a positive value, the start boundary angle sba may be determined as the value of the lowermost profile LP. On the other hand, when the rotation velocity RV of the previous processing section has a negative value, the start boundary angle sba may be determined as the value of the uppermost profile UP. For example, referring to FIG. 4B, with reference to an example of the driving profile shown in FIG. 4A, the first processing section S1 has a rotation velocity RV that is negative, the second processing section S2 has a rotation velocity RV that is positive, and the third processing section S3 has a rotation velocity RV that is negative. As the first processing section S1, which is the previous processing section to the second processing section S2, has the rotation velocity RV that is negative, the start boundary angle sba2 of the second processing section S2 is on the uppermost profile UP. As the second processing section S2, which is the previous processing section to the third processing section S3, has the rotation velocity RV that is positive, the start boundary angle sba3 of the third processing section S3 is on the lowermost profile LP.

Hereinafter, a method of generating an optimization profile OP for determining changes in the rotation angle RA of the antenna 200 will be described with reference to FIGS. 5 and 6. FIGS. 5 and 6 each are a diagram for describing a method of generating the optimization profile for a specific processing section according to an embodiment of the disclosure. For convenience of explanation, the uppermost profile UP and the lowermost profile LP are not shown in FIGS. 5 and 6.

The controller 300 may configure the rotation velocity RV of the antenna 200 with preset optimization rotation velocities (for example, a first optimized rotation velocity v1 and a second optimized rotation velocity v2) for each of the processing sections, to thereby generate the optimization profile OP for determining the changes in the rotation angle RA of the antenna 200. Hereinafter, from among n processing sections, a specific processing section Sj (where n and j satisfy 1≤j≤n) will be described as an example. The processing section Sj may be formed in a section between two points (a point at which a start time is stj and a point at which a finish time is ftj) at which the rotation velocity is zero. When the start time is stj, a start boundary angle sbaj may be determined as a value UPm on the uppermost profile UP, and when the finish time is ftj, a finish boundary angle fbaj may be determined as a value LPm on the lowermost profile LP.

Information regarding the optimized rotation velocity of the antenna 200 may include the first optimized rotation velocity v1 to an mth optimized rotation velocity vm (where m is a natural number greater than 1) having greater values in a certain order. For example, the information regarding the optimized rotation velocity may include the second optimized rotation velocity v2 greater than the first optimized rotation velocity v1. For example, the optimized rotation velocity of the antenna 200 may include 0.8 deg/sec, 1.6 deg/sec, and 3.2 deg/sec.

Referring to FIG. 5, the controller 300 may determine the first optimized rotation velocity v1 as the rotation velocity RV of the antenna 200 for the processing section Sj. Hereinafter, the controller 300 may determine a rotation area DA1 in which the antenna 200 rotates at the first optimized rotation velocity v1 and a stop area SA1 in which the antenna 200 does not rotate, such that an error between the basic profile BP and the optimization profile OP1 for the processing section Sj has a minimum value. In other words, a start time dt in the rotation area DA1 may be determined between the start time stj and finish time ftj of the processing section Sj such that an error between the basic profile BP and the optimization profile OP1 has a minimum value. Next, the controller 300 may determine the optimization profile OP1 of the processing section Sj based on the rotation area DA1 and the stop area SA1.

When the rotation angle RA, according to the optimization profile OP1 determined according to the description, is between the uppermost profile UP and the lowermost profile LP, the controller 300 may generate an optimization profile (not shown) for a next processing section S(j+1). Otherwise, in a case A where the rotation angle RA according to the optimization profile OP1 is not between the uppermost profile UP and the lowermost profile LP, optimization profiles OP may be generated for the following two cases.

In a case B where the rotation angle RA according to the optimization profile OP is not between the uppermost profile UP and the lowermost profile LP but an absolute value of the first optimized rotation velocity v1 is less than an absolute value of the rotation velocity RV according to the basic profile BP, the controller 300 may select the second optimized rotation velocity v2 as the rotation velocity RV of the antenna 200. The case B may include a case where the first optimized rotation velocity v1 is less than the rotation velocity RV according to the basic profile BP. For example, the case B may include the following two cases: i) v1<(a rotation velocity according to the basic profile BP) when v1>0; ii) v1>(the rotation velocity according to the basic profile BP) when v1<0. Next, a rotation area in which the antenna 200 rotates at the second optimized rotation velocity v2 and a stop area in which the antenna 200 does not rotate may be determined such that an error between the basic profile BP and the second optimization profile OP2 for the processing section Sj has a minimum value. Next, an optimization profile OP1' (not shown) of the corresponding processing section Sj may be determined based on the rotation area and the stop area.

Unlike in FIG. 5, in the case A where the absolute value of the first optimized rotation velocity v1 is greater than the absolute value of the rotation velocity RV according to the basic profile BP, the controller 300 may increase the number of rotation area, in which the antenna 200 rotates at the first optimized rotation velocity v1, sequentially one by one. The case C may include a case where the first optimized rotation velocity v1 is greater than the rotation velocity RV according to the basic profile BP. For example, the case C may include the following two cases: i) v1>(the rotation velocity according to the basic profile BP) when v1>0; ii) v1<(the rotation velocity according to the basic profile BP when v1<0. For example, under assumption that the first optimized rotation velocity v1 is the second optimized rotation velocity v2 shown in FIG. 6, the controller 300 may again determine a first rotation area DA2-1, a second rotation area DA2-2, and a stop area SA2 between the first rotation area DA2-1 and the second rotation area DA2-2, in which the antenna 200 rotates at the second optimized rotation velocity v2, for the processing section Sj, such that an error between the basic profile BP and the optimization profile OP2 has a minimum value. Next, the optimization profile OP2 of the processing section Sj may be generated based on the first rotation area DA2-1, the second rotation area DA2-2, and the stop area SA2.

FIGS. 7A and 7B are diagrams of the optimization profile OP of the rotation angle RA and the optimization profile OP of the rotation velocity RV, according to an embodiment of the disclosure. FIG. 7A shows the basic profile BP, the uppermost profile UP, the lowermost profile LP, and the optimization profile OP of the antenna 200 according to an embodiment for the rotation angle RA (degree), and FIG. 7B shows the basic profile BP and the optimization profile OP for the rotation velocity RV (degree/sec). FIG. 7B may be calculated by differentiating the profile of FIG. 7A with respect to time.

A case in which the artificial satellite 10 revolves around the communicable area CA (see FIG. 1) on the preset orbit for 400 seconds (sec) will be described as an example with reference to FIGS. 7A and 7B.

Referring to FIGS. 7A and 7B, by the method described as an example with reference to FIGS. 3 to 6, a final optimization profile OP may be generated by synthesizing the optimization profiles generated for all of the processing sections. Like the basic profile BP, the optimization profile OP may also be expressed by a quintic polynomial for each processing section, and the quintic polynomial may be determined by the start time st (see FIGS. 4A and 4B) and six polynomial coefficients. In addition, referring to P portions marked with circles in FIG. 7A, torque due to discontinuity of the rotation velocity may be reduced as much as possible by performing curve fitting at a boundary portion of each processing section when a final optimization profile OP is formed.

A result of comparing the basic profile BP with the optimization profile OP with respect to the rotation velocity will be described with reference to FIG. 7B. Compared with an existing case in which the antenna 200 rotates at the rotation velocity of the basic profile BP, it is obvious that movements of the antenna 200 significantly decreases as in the optimization profile OP after optimizing the driving of the antenna 200.

As described above, according to the method of optimizing the driving of the antenna 200 according to an embodiment of the disclosure, the movement of the antenna 200 may be reduced as much as possible by optimizing changes in the rotation angle RA and rotation velocity RV of the antenna 200 to reduce image jitter and improve image quality.

FIG. 8 is a flowchart of a method of optimizing driving of an antenna, according to an embodiment of the disclosure. Same contents as the contents described above will be briefly described or omitted, and may be described in conjunction with the drawings described above.

In the method according to an embodiment of the disclosure, the basic profile BP may be received (S100). The basic profile BP indicates changes in the rotation angle RA of the antenna 200 such that the center line cl points to the ground station 20 in response to movements of the artificial satellite 10. Next, the processing sections may be determined with reference to points at which the rotation velocity RV of the antenna 200 with reference to the basic profile BP is zero (S200). Next, the optimization profile OP determining the changes in the rotation angle RAA of the antenna 200 may be determined by configuring the rotation velocity RV of the antenna 200 for the processing sections with preset optimization rotation velocities (S300).

After the determining of the processing sections (S200), the start boundary angle sba and the finish boundary angle fba of the processing section may be determined based on the basic profile BP, the uppermost profile UP, and the lowermost profile LP.

S100 and S300 will be described in further detail with reference to FIGS. 9 and 10 to be described later.

FIG. 9 is a flowchart for more specifically describing S100, which is a specific operation of the method of FIG. 8. S100 may include S110, S120, and S130 to be described later.

Information regarding the optimized rotation velocity of the antenna 200 determined by the structure of the artificial satellite 10 may be received. In parallel to S110, the structure of the antenna 200 may be determined, and information regarding the rotation angle RA, in which the antenna 200 may communicate with the ground station 20, may be received. Next, the uppermost profile UP and the lowermost profile LP may be generated based on the rotation angle RA, in which the communication may be performed, and the basic profile BP (S130).

FIG. 10 is a flowchart for more specifically describing S300, which is a specific operation of the method of FIG. 8. S300 may include the following operations. Next, same contents as the contents described above may be briefly described or omitted.

First, a $j^{th}$ processing section Sj (where j is a natural number) may be selected, starting from the first processing section S1 (where j is 1). For example, j may be greater or equal to 1 and may be less than or equal to 20. That is, there may be up to twenty processing sections.

An $i^{th}$ optimized rotation velocity vi (where i is a natural number) may be selected as a rotation velocity of the antenna 200, starting from the first rotation velocity v1 (where i is 1) (S320). For example, the information regarding the optimized rotation velocity may include the first optimized rotation velocity v1 and the second optimized rotation velocity v2 greater than the first optimized rotation velocity v1.

Next, a rotation area DA in which the antenna 200 rotates at a selected optimized rotation velocity and a stop area SA in which the antenna 200 does not rotate may be determined such that an error between the basic profile BP and the optimization profile OP with respect to the selected processing section has a minimum value (S330).

Next, it may be determined whether a rotation angle according to the optimization profile OP in the selected processing section is between a rotation angle according to the uppermost profile UP and a rotation angle according to the lowermost profile LP (S340).

When the rotation angle according to the optimization profile OP in the selected processing section is between the rotation angle according to the uppermost profile UP and the rotation angle according to the lowermost profile LP (S340—YES), the optimization profile for the selected processing section may be determined based on the rotation area and the stop area that have been determined (S370). Next, it may be determined whether the selected processing section is a final processing section (S380). When the selected processing section is the final processing section (S380—YES), a final optimization profile may be formed by synthesizing the optimization profiles generated for all of the processing sections, and the method of optimizing the driving of the antenna 200 according to an embodiment may be finished. When the selected processing section is not the final processing section (S380—NO), operation after S310 may be performed with respect to a next processing section (a $(j+1)^{th}$ processing section)($j \rightarrow (j-1)$)(S390).

When the rotation value according to the optimization profile OP in the selected processing section is not between the rotation angle according to the uppermost profile UP and the rotation angle according to the lowermost profile LP, it may be determined whether the absolute value of the optimization rotation value in the selected processing section is less than the absolute value of the rotation velocity according to the basic profile BP (S345).

When the absolute value of the optimized rotation velocity selected in the selected processing section is less than the absolute value of the rotation value according to the basic profile BP (S345—YES), operations after S320 may be performed with respect to a next optimized rotation velocity (an $(i+1)^{th}$ rotation velocity) ($i \rightarrow (i+1)$) (S360). For example, when the absolute value of the first optimized rotation velocity (i=1) is less than the absolute value of the rotation velocity according to the basic profile BP, the second optimized rotation velocity (i=2) may be selected as the rotation velocity of the antenna 200. Next, the stop area in which the antenna 200 rotates at the second optimized rotation velocity and the stop area in which the antenna 200 does not rotate may be determined such that the error between the basic profile BP and the optimization profile OP for the selected processing section has a minimum value (S330). Next, the optimization profile OP of the selected processing section may be determined based on the rotation area for the processing section after S340 (S370).

When the absolute value of the selected optimization rotation value in the selected processing section is greater than the absolute value of the rotation value according to the basic profile BP (S340—NO), the number of rotation area in which the antenna rotates at the selected optimized rotation velocity may be sequentially increased one by one such that an error between the basic profile BP and the optimization profile OP for the selected processing section has a minimum value (S350). Next, operations after S330 may be performed. For example, when the absolute value of the first optimization rotation value (i=1) is greater than the absolute value of the rotation velocity according to the basic profile BP, the first rotation area in which the antenna 200 rotates at the first optimized rotation velocity, the second rotation area, and the stop area between the first rotation area and the second rotation area may be determined. Next, the optimization profile OP of the selected processing section may be determined based on the first rotation area, the stop area, and the second rotation area for the selected processing section after S340 (S370).

As described above, according to an embodiment of the disclosure, the driving of the antenna 200 may be optimized by controlling the rotation angle RA of the antenna 200 for communication of the artificial satellite 10. Accordingly, a vibration source of an image-mounting object such as a camera mounted in the artificial satellite 10 is reduced and image jitter is reduced, and thus, image quality may be improved.

FIGS. 11A and 11B shows a result of comparing amplitudes of a vibration source of the antenna 200 before and after performing the method of optimizing the driving of the antenna 200. FIG. 11A shows an amplitude of the vibration source of the antenna 200 according to the basic profile BP, and FIG. 11B shows an amplitude of the vibration source of the antenna 200 according to the optimization profile OP according to an embodiment. Comparing the basic profile BP with the optimization profile OP, a significant decrease in the amplitude of the vibration source of the antenna 200 may be found according to a decrease in an amplitude and a frequency after optimizing the driving of the antenna 200. As described above, according to the disclosure, shaking of a line of sight of the image-mounting object of the artificial satellite 10 may be prevented by reducing the movements of the antenna 200 as much as possible, so as to improve image quality.

FIGS. 12A and 12B show a result of comparing profiles of image jitter before and after optimizing the driving of the antenna 200, according to an embodiment of the disclosure. FIG. 12A shows image jitter of the basic profile BP before the optimization, and FIG. 12B shows image jitter of the optimization profile OP after the optimization. According to an embodiment, the basic profile BP and optimization profile OP shown in FIGS. 12A and 12B may be profiles for the elevation angle (see FIG. 2) of the antenna 200, and an AZ vel profile may be a profile for the azimuth AZ (see FIG. 2) of the antenna 200. Comparing FIGS. 12A and 12B, it is seen that image jitter significantly decreases after optimizing the driving of the antenna 200 and the image quality is improved.

The embodiments according to the disclosure may be implemented as computer programs that may be executed by using various components in the computer, and such computer programs may be recorded on a computer-readable medium. Here, the medium may store computer-executable programs. An example of the medium may include a magnetic medium such as hard disk, floppy disk, and a magnetic tape, an optical writing medium such as a CD-ROM and DVD, a magneto-optical medium such as floptical disk, and a medium including ROM, RAM, a flash memory and the like and configured to store program instructions.

The computer program may be specifically designed and configured for the disclosure or may be known and used by one of ordinary skill in the computer software field. An example of the computer program may include a high-level language code executable by a computer by using an interpreter and the like, as well as a machine language code made by a compiler.

In addition, although desirable examples of the disclosure have been shown and described above, the disclosure is not limited thereto and may be variously modified by one of ordinary skill in the art without escaping from the spirit of the disclosure claimed in the following claims, and the modified examples are not to be understood independent from the spirit or prospect of the disclosure.

Accordingly, the spirit of the disclosure is not limited to the embodiments described above, and it will be understood that all scope equal to the claims or equivalently modified from the claims, not as well as the following claims, are in the scope of the spirit of the disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of optimizing driving of an antenna for communication of an artificial satellite by controlling a rotation angle of the antenna, the method comprising:
    receiving a basic profile indicating a change in a rotation angle of the antenna such that a center line of the antenna points to a ground station in response to movement of the artificial satellite;
    determining a processing section with reference to points at which a rotation velocity of the antenna, for the basic profile, is zero; and
    generating an optimization profile that determines the change in the rotation angle of the antenna, by configuring the rotation velocity of the antenna, for the processing section, with a preset optimized rotation velocity;
    wherein the receiving of the basic profile comprises:
        receiving information regarding the optimized rotation velocity of the antenna, determined according to a structure of the artificial satellite;
        receiving information regarding a rotation angle determined according to a structure of the antenna and at which communication between the antenna and the ground station is allowed; and
        generating an uppermost profile and a lowermost profile, based on the rotation angle at which the communication between the antenna and the ground station is allowed and the basic profile.

2. The method of claim 1, further comprising, after the determining of the processing section, determining a start boundary angle and a finish boundary angle of the processing section, based on the basic profile, the uppermost profile, and the lowermost profile.

3. The method of claim 1, wherein the generating of the optimization profile comprises:
    determining a rotation area in which the antenna rotates at the optimized rotation velocity and a stop area in which the antenna does not rotate, such that an error between the basic profile and the optimization profile, for the processing section, has a minimum value; and
    determining the optimization profile of the processing section, based on the rotation area for the processing section.

4. The method of claim 3, wherein the information regarding the optimized rotation velocity comprises a first optimized rotation velocity and a second optimized rotation velocity greater than the first optimized rotation velocity, and
    the generating of the optimization profile comprises:
    selecting the first optimized rotation velocity as a rotation velocity of the antenna;
    determining a rotation area in which the antenna rotates at the first optimized rotation velocity and a stop area in which the antenna does not rotate, such that an error between the basic profile and the optimization profile with respect to the processing section has a minimum value; and
    determining the optimization profile of the processing section based on the rotation area for the processing section.

5. The method of claim 4, wherein the generating of the optimization profile further comprises;
    generating an optimization profile for a next processing section when a rotation angle according to the optimization profile in the processing section is between a rotation angle according to the uppermost profile and a rotation angle according to the lowermost profile.

6. The method of claim 4, wherein the generating of the optimization profile further comprises:
    when a rotation angle according to the optimization profile in the processing section is not between a rotation angle according to the uppermost profile and a rotation angle according to the lowermost profile and an absolute value of the first optimized rotation velocity is less than an absolute value of a rotation velocity according to the basic profile, selecting the second optimized rotation velocity as the rotation velocity of the antenna;

determining a rotation area in which the antenna rotates at the second optimized rotation velocity and a stop area in which the antenna does not rotate, such that an error between the basic profile and the optimization profile with respect to the processing section has a minimum value; and determining the optimization profile of the processing section, based on the rotation area for the processing section.

7. The method of claim 4, wherein the generating of the optimization profile, further comprises:

when a rotation angle according to the optimization profile in the processing section is not between a rotation angle according to the uppermost profile and a rotation according to the lowermost profile and an absolute value of the first optimized rotation velocity is greater than an absolute value of the rotation velocity according to the basic profile, determining a first rotation area in which the antenna rotates at the first optimized rotation velocity, a second rotation area in which the antenna rotates at the second optimized rotation velocity, and the stop area between the first rotation area and the second rotation area, such that an error of the basic profile and the optimization profile with respect to the processing section has a minimum value; and determining the optimization profile of the processing section, based on the first rotation area, the stop area, and the second rotation area with respect to the processing section.

8. The method of claim 1, wherein the antenna uses a wireless signal in an X-band having a frequency range from 8 GHz to 12 GHz.

9. A non-transitory computer-readable recording medium that stores a computer program including instructions, when executed by a processor, to perform the method of claim 1.

10. An apparatus for optimizing driving of an antenna for communication of an artificial satellite, by controlling a rotation angle of the antenna, the apparatus comprising the antenna and a controller, wherein the controller is configured to:

receive a basic profile indicating a change in a rotation angle of the antenna such that a center line of the antenna points to a ground station in response to movement of the artificial satellite;

determine a processing section based on points at which a rotation velocity of the antenna, for the basic profile, is zero; and generate an optimization profile that determines changes in the rotation angle of the antenna, by configuring the rotation velocity of the antenna, for the processing section, with a preset optimized rotation velocity; and wherein the controller is further configured to:

receive information regarding the optimized rotation velocity of the antenna determined according to a structure of the artificial satellite;

receive information regarding a rotation angle determined according to the structure of the antenna and at which communication between the antenna and the ground station is allowed; and generate an uppermost profile and a lowermost profile, based on the rotation angle at which the communication between the antenna and the ground station is allowed, and the basic profile.

11. The apparatus of claim 10, wherein the controller is further configured to, after determining the processing section, determine a start boundary angle and a finish boundary angle of the processing section, based on the basic profile, the uppermost profile, and the lowermost profile.

12. The apparatus of claim 10, wherein the controller is further configured to:

determine a rotation area in which the antenna rotates at the optimized rotation velocity and a stop area in which the antenna does not rotate, such that an error between the basic profile and the optimization profile with respect to the processing section has a minimum value; and determine the optimization profile of the processing section, based on the rotation area for the processing section.

13. The apparatus of claim 12, wherein information regarding the optimized rotation velocity comprises a first optimized rotation velocity and a second optimized rotation velocity greater than the first optimized rotation velocity, and the controller is further configured to:

select the first optimized rotation velocity as a rotation velocity of the antenna;

determine a rotation area in which the antenna rotates at the first optimized rotation velocity and a stop area in which the antenna does not rotate, such that an error between the basic profile and the optimization profile, for the processing section, has a minimum value; and generate the optimization profile by determining the optimization profile of the processing section, based on the rotation area for the processing section.

14. The apparatus of claim 13, wherein the controller is further configured to generate the optimization profile by generating an optimization profile for a next processing section, when a rotation angle according to the optimization profile in the processing section is between a rotation angle according to the uppermost profile and a rotation angle according to the lowermost profile.

15. The apparatus of claim 13, wherein the controller is further configured to, when a rotation angle according to the optimization profile in the processing section is not between a rotation angle according to the uppermost profile and a rotation angle according to the lowermost profile and an absolute value of the first optimized rotation velocity is less than an absolute value of a rotation velocity according to the basic profile, select the second optimized rotation velocity as a rotation velocity of the antenna, determine a rotation area in which the antenna rotates at the second optimized rotation velocity and a stop area in which the antenna does not rotate, such that an error between the basic profile and the optimization profile, for the processing section, has a minimum value, and generate the optimization profile by determining the optimization profile of the processing section, based on the rotation area for the processing section.

16. The apparatus of claim 13, wherein the controller is further configured to, when a rotation angle according to the optimization profile in the processing section is not between a rotation angle according to the uppermost profile and a rotation angle according to the lowermost profile and an absolute value of the first optimized rotation velocity is greater than an absolute value of the rotation velocity according to the basic profile, determine a first rotation area in which the antenna rotates at the first optimized rotation velocity, a second rotation area in which the antenna rotates at the first optimized rotation velocity, and a stop area between the first rotation area and the second rotation area, such that an error between the basic profile and the optimization profile, for the processing section, has a minimum value, and determine the optimization profile of the processing section, based on the first rotation area, the stop area, and the second rotation area for the processing section, to thereby generate the optimization profile.

17. The apparatus of claim 10, wherein the antenna uses a wireless signal in a X-band having a frequency range from 8 GHz to 12 GHz.

* * * * *